United States Patent
Li et al.

(10) Patent No.: US 7,914,152 B2
(45) Date of Patent: Mar. 29, 2011

(54) PORTABLE PROJECTOR USING AN LED AND RELATED HEAT DISSIPATION SYSTEM

(75) Inventors: Xu Li, Shenzhen (CN); Gen-Ping Deng, Shenzhen (CN); Chun-Chi Chen, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 395 days.

(21) Appl. No.: 12/024,955

(22) Filed: Feb. 1, 2008

(65) Prior Publication Data

US 2009/0195756 A1  Aug. 6, 2009

(51) Int. Cl.
*G03B 21/16* (2006.01)
(52) U.S. Cl. ............. 353/54; 353/60; 353/61; 313/35; 313/36; 362/555; 362/561
(58) Field of Classification Search ............. 353/54, 353/60, 61; 313/35, 36; 362/555, 561, 800
See application file for complete search history.

(56) References Cited

U.S. PATENT DOCUMENTS

| | | | | |
|---|---|---|---|---|
| 7,226,171 B2 * | 6/2007 | Fujimori et al. | ............. | 353/52 |
| 7,263,269 B2 * | 8/2007 | Miyashita | ............. | 385/147 |
| 7,334,898 B2 * | 2/2008 | Seto et al. | ............. | 353/61 |
| 7,578,595 B2 * | 8/2009 | Miwa et al. | ............. | 353/54 |

FOREIGN PATENT DOCUMENTS

| | | |
|---|---|---|
| CN | 101035424 A | 9/2007 |
| JP | 2005-338282 | 12/2005 |

* cited by examiner

*Primary Examiner* — Seung C Sohn
(74) *Attorney, Agent, or Firm* — Jeffrey T. Knapp

(57) ABSTRACT

A portable projector with a heat dissipation system, includes a housing and two LED light sources located in the housing. Each of the LED light sources includes a circuit aboard, an LED device mounted on the circuit aboard and a heat pipe. The heat pipe has an evaporating section thermally contacting the circuit board, and a condensing section. A fin set thermally contacts with the condensing section of the heat pipe for dissipating heat therefrom. The fin set of one LED light source is located behind the evaporating section of the heat pipe of the other light source and closely adjacent to a wall of the housing.

11 Claims, 5 Drawing Sheets

PORTABLE PROJECTOR USING AN LED AND RELATED HEAT DISSIPATION SYSTEM

BACKGROUND OF THE INVENTION

1. Field of the Invention

The present invention relates to a portable projector, and more particularly to a portable projector that uses light emitting diodes (LEDs) and a related heat dissipation system.

2. Description of Related Art

Since projectors have become increasingly popular, the requirements of potable projectors have grown too. Projectors are high precision opto-mechatronics products; their components are highly temperature sensitive, and have a very complicated layout. Consequently, the cooling capabilities of the projector are very important. In particular, improving cooling capabilities without increasing the size of the projector is of interest.

Generally, the related art projector requires a very high brightness to obtain good quality images, and so needs a high power light source. After a long period of operation, the light source generates a large amount of heat within the projector. In addition to the heat generated by the light source, the power supply and imaging system of the projector also generate heat during the operation. Furthermore, the heat generated by the light source, the imaging system, and the power supply are all accumulated in the projector, which leads to a high temperature that affects the operation and lifetime of the projector.

What is needed therefore is to provide a portable projector having a heat dissipation system to ensure a reliable operation of the projector. Furthermore, the projector can have an extended life span of use.

SUMMARY OF THE INVENTION

A portable projector with a heat dissipation system, includes a housing and two LED light sources located in the housing. Each of the LED light sources includes a circuit aboard, an LED device mounted on the circuit aboard and a heat pipe. The heat pipe has an evaporating section thermally contacting the circuit board, and a condensing section. A fin set thermally contacts with the condensing section of the heat pipe for dissipating heat therefrom. The fin set of one LED light source is located behind the evaporating section of the heat pipe of the other light source and closely adjacent to a wall of the housing.

BRIEF DESCRIPTION OF THE DRAWINGS

Many aspects of the present portable projector using a related heat dissipation system can be better understood with reference to the following drawings. The components in the drawings are not necessarily drawn to scale, the emphasis instead being placed upon clearly illustrating the principles of the present portable projector using a related heat dissipation system. Moreover, in the drawings, like reference numerals designate corresponding parts throughout the several views.

DETAILED DESCRIPTION OF THE INVENTION

Figure 1:
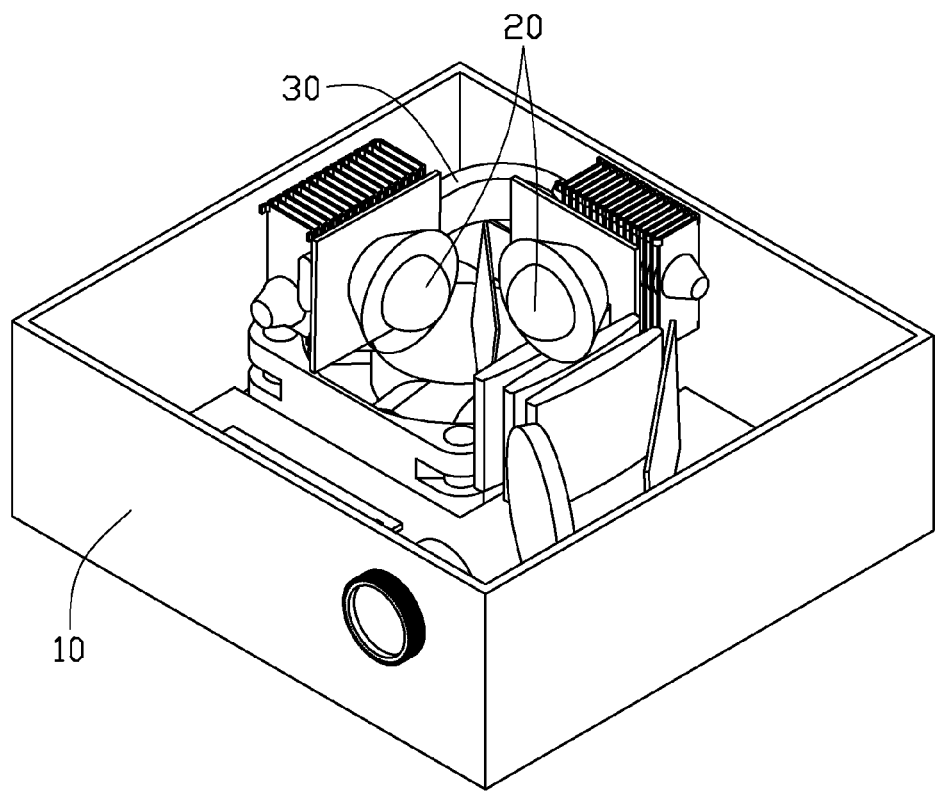
FIG. 1 is an isometric view of a portable projector with a heat dissipation system in accordance with a preferred embodiment of the present invention, wherein a hood of the projector is removed for clarity.
Figure 2:
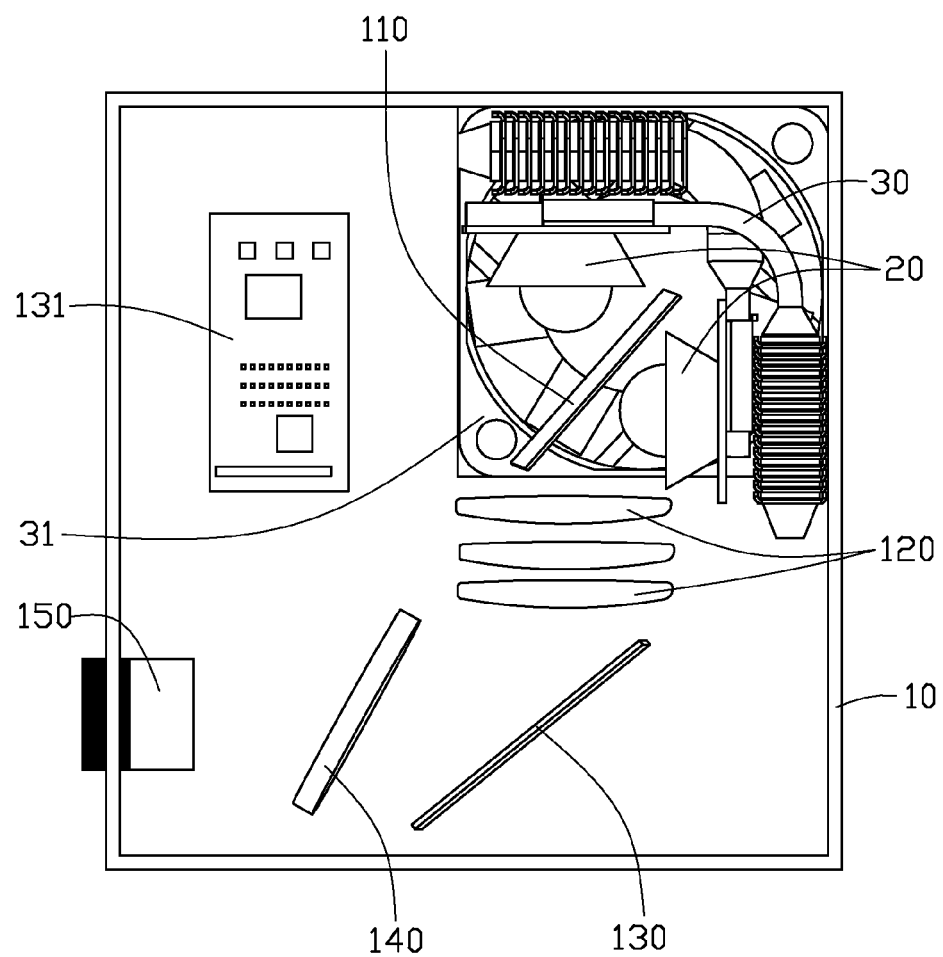
FIG. 2 is a top plan view of FIG. 1.

Referring to FIGS. 1 and 2, a portable projector with a heat dissipation system is shown. The projector comprises a housing 10, two light sources 20 in the housing 10, and a heat dissipation system 30 thermally connecting with the light sources 20 in the housing 10.

As shown in FIGS. 1 and 2, the light sources 20 placed in the housing 10 are used for providing light when the projector is in operation. The light sources 20 are preferably LED devices, which can reduce the power consumption of the projector and reduce operating heat load. The first and second light sources 20 have light directions thereof perpendicular to each other. A first light condenser 110 is diagonally positioned between the two light sources 20. Light from the first and second light sources 20 is collected by the first light condenser 110 and then perpendicularly passes through a spectroscope 120 which is angled to the first light condenser 110. The light from the spectroscope 120 is angularly reached a liquid crystal panel 130 which is located with a little distance from the spectroscope 120 and is controlled by a control circuit 131. A second light condenser 140 is confronted to the liquid crystal panel 130 and collects the light from the liquid crystal panel 130 to reach a lens module 150 via which the light passes through the housing 10. Therefore, images then can be obtained at a screen (not shown).

The heat dissipation system 30 comprises a fan 31, a first heat sink 32 and a second heat sink 35 located over the fan 31.

Figure 3:
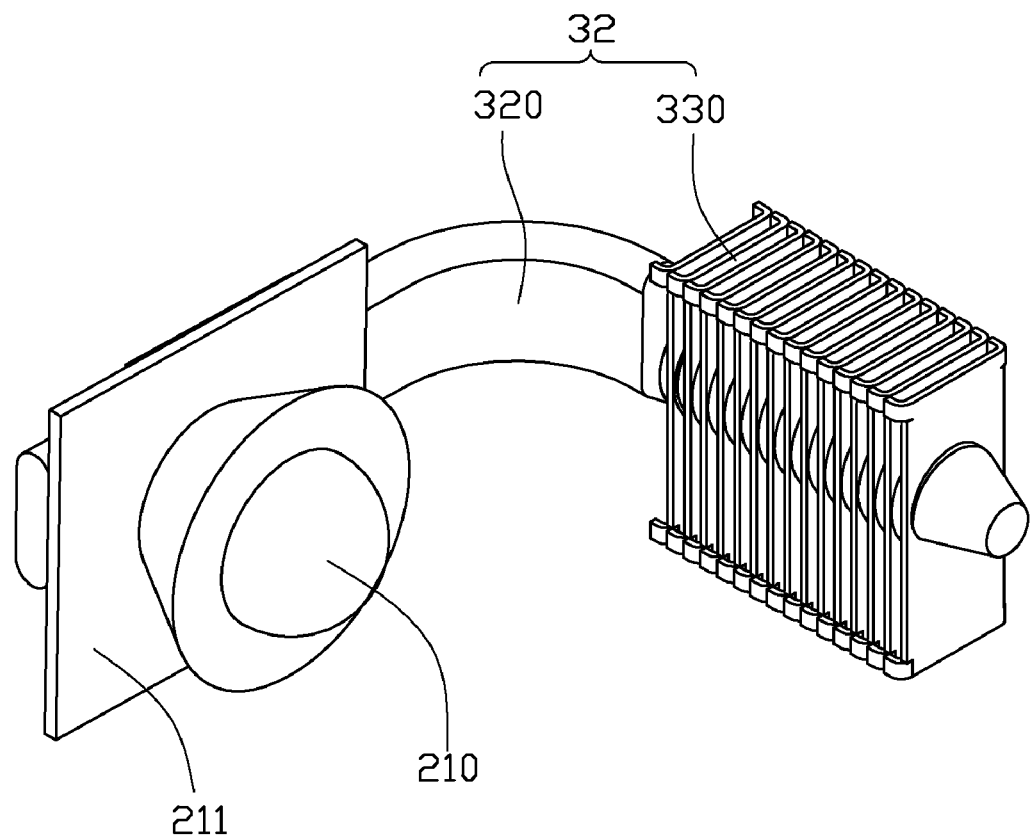
FIG. 3 shows a first heat sink of the heat dissipation system with an LED device of FIG. 1.
Figure 4:
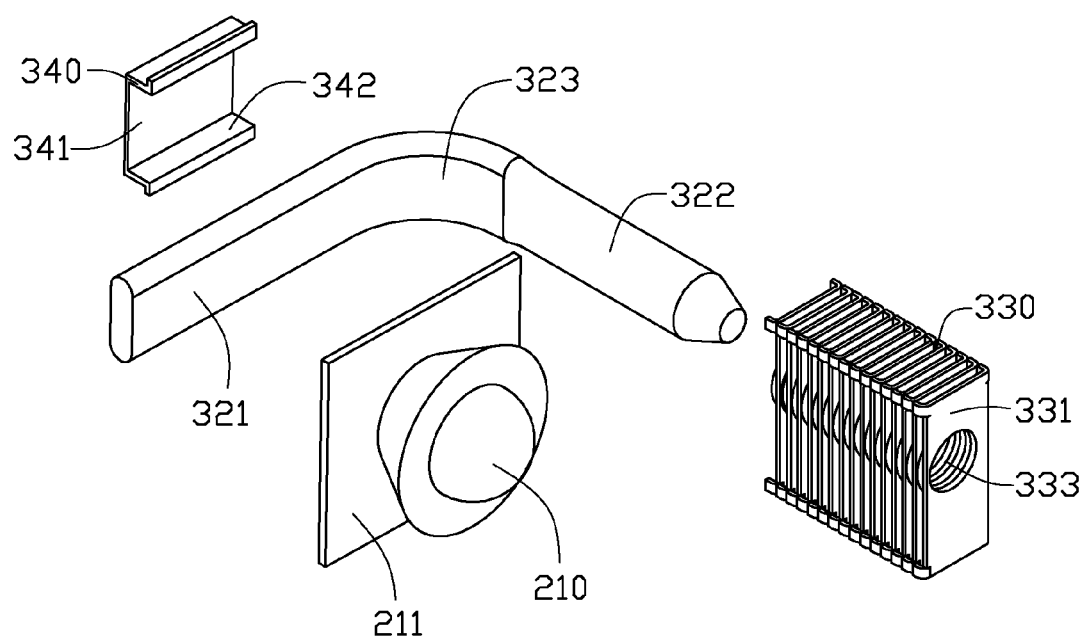
FIG. 4 is an isometric, exploded view of FIG. 3.

Referring also to FIGS. 3 and 4, the first heat sink 32 comprises a heat pipe 320 and a fin set 330 thermally positioned onto the heat pipe 320. The heat pipe 320 has phase changeable working fluid sealed therein. The heat pipe 320 is substantially L-shaped and comprises an evaporating section 321, a condensing section 322 and a connecting section 323 connecting the evaporating section 321 and the condensing section 322 together. The evaporating section 321 has two flat faces at two opposite sides thereof. The first light source comprises an LED 210 and a circuit board 211 on which the LED 210 is mounted. The circuit board 211 of the first light source 20 thermally contacts one of the flat faces of the evaporating section 321. A fixing member 340 comprises a plate 341 and two flanges 342 extending from two opposite sides of the plate 341. Each flange 342 is substantially L-shaped. The plate 341 contacts the other of the two flat faces of the evaporating section 321; therefore, the evaporating section 321 is fixedly sandwiched between the plate 341 and the circuit board 211. The flanges 342 have bottom faces thereof secured to the circuit board 211, thereby fixedly positioning the evaporating section 321 between the fixing member 340 and the printed circuit board 211. The connecting section 323 of the heat pipe 320 has a flattened cross section and an arced shape. The condensing section 322 of the heat pipe 320 has a circular cross section. The fin set 330 comprises a plurality of fins 331 assembled together via locking structures (not labeled) constructed at four corners of each fin 331. Each fin 331 defines a through hole (not labeled) in a central portion thereof. A collar (not labeled) extends outwardly from a circumference of the hole of fin 331. In the fin set 330, the collar of each fin 331 contacts an adjacent fin 331, and the holes of the fins 331 cooperatively define a receiving passage 333. The condensing section 322 is received in the passage 333 of the fin set 330, and has a cone distal end thereof extending beyond the passage 333.

Figure 5:
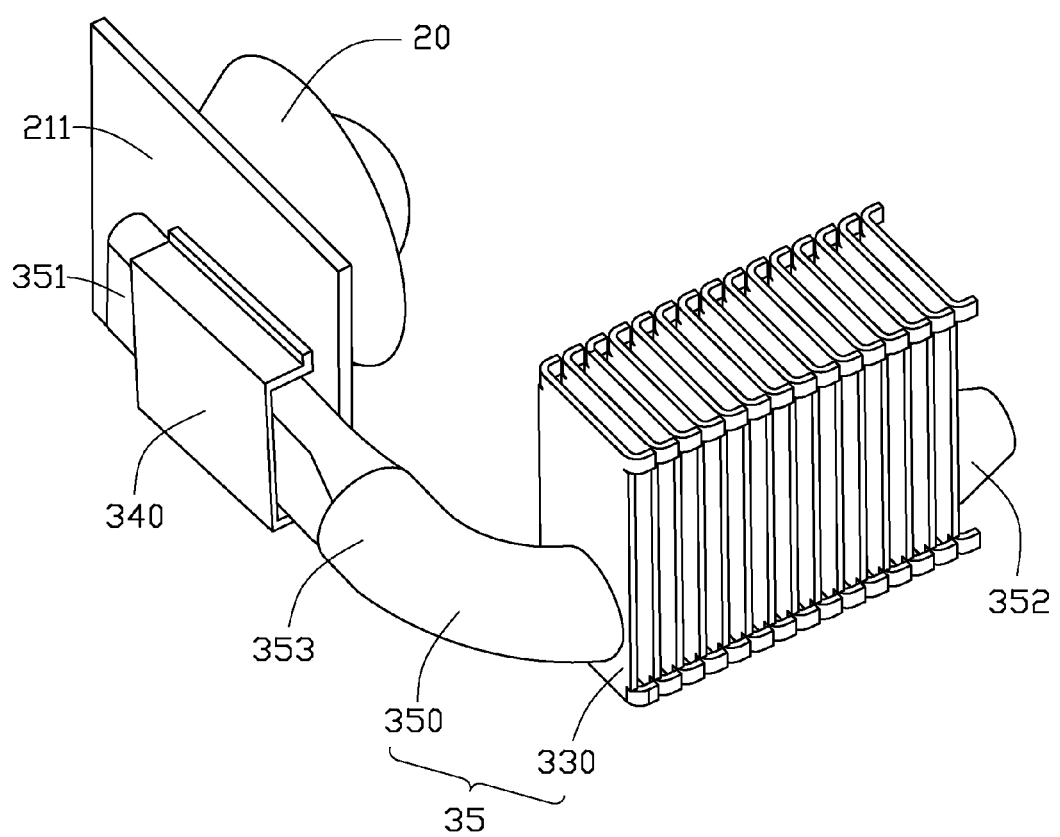
FIG. 5 shows a second heat sink of the heat dissipation system with an LED device of FIG. 1.

Referring to FIG. 5, the second heat sink 35 has a construction similar to that of the first heat sink 32. A difference between the second heat sink 35 and the first heat sink 32 is that a heat pipe 350 of the second heat sink 35 has a circular connecting section 353 between an evaporating section 351 and a condensing section 352. The second light source 20 has a circuit board 211 thereof thermally contacting the evaporating section 351 via a fixing member 340 fixing the heat pipe 350 to the circuit board 211. A fin set 330 is positioned around the condensing section 352 and thermally connects therewith. Referring to FIG. 2, the fin set 330 of the firs heat sink 32 is located behind the evaporating section 351 of the heat pipe 350 of the second heat sink 35; meanwhile, the fin set 330 of the second heat sink 35 is located behind the evaporating section 321 of the heat pipe 320 of the first heat sink 32. Furthermore, the fins sets 330 are located closely adjacent to walls of the housing 10, respectively, whereby the space of the housing 10 can be efficiently utilized to enable the projector to have a high heat dissipating capability so that the projector can have a portable size without worry of overheating during operation thereof.

The fan 31 is positioned at under the first, second heat sinks 32, 35 and the first, second light sources 20 for providing a forced airflow to the heat sinks 32, 35 and the light sources 20.

In use, the first and second light sources 20 emit light and generates heat. The heat reaches the evaporating sections 321, 351 of the heat pipes 320, 350 via the circuit boards 211 of the first and second light sources 20. The heat in the evaporating sections 321, 351 is transferred to the condensing sections 322, 352 via the connecting sections 323, 353 of the heat pipes 320, 350, and then to the fin sets 330 to be dissipated to ambient air quickly by virtue of the fan 31.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A projector comprising:
    a housing;
    a light source located in the housing;
    a heat pipe located in the housing, the heat pipe having phase changeable working fluid sealed therein, and having an evaporating section thermally contacting the light source for absorbing heat from the light source, and a condensing section extending remote from the evaporating section;
    a fin set positioned onto the condensing section of the heat pipe and thermally connecting therewith; and
    a fixing member, wherein the evaporating section of the heat pipe is sandwiched between the fixing member and the light source;
    wherein heat generated by the light source is absorbed by the evaporating section of the heat pipe and transferred to the fin set via the condensing section of the heat pipe to be dissipated;
    wherein the evaporating section of the heat pipe has a first flat face thermally contacting the light source; and
    wherein the fixing member comprises a plate and two flanges extending from the plate, and the evaporating section of the heat pipe has a second flat face contacting the plate.

2. The projector of claim 1, wherein the condensing section of the heat pipe has a circular cross section.

3. The projector of claim 1, wherein the second flat face of the evaporating section of the heat pipe is opposite to the first flat face.

4. The projector of claim 1, wherein the light source comprises a circuit aboard and an LED device mounted thereon, the two flanges of the fixing member abutting against the circuit board.

5. The projector of claim 4, wherein each of the two flanges is L-shaped.

6. The projector of claim 1 further comprising a fan, wherein the fan is located under the heat pipe, the fin set and the light source for providing an airflow to the heat pipe, the fin set and the light source.

7. A projector comprising:
    a housing;
    an LED light source located in the housing, comprising a circuit board;
    a heat pipe with phase changeable working fluid sealed therein, the heat pipe having an evaporating section comprising a face thermally contacting the circuit board of the LED light source, and a condensing section extending away from the circuit board of the LED light source;
    a fin set thermally contacting with the condensing section of the heat pipe; and
    a fan, wherein the fan is located under the LED light source and the fin set for providing airflow to the LED light source and the fin set.

8. The projector of claim 7, wherein the fin set comprises a plurality of fins assembled together via locking structures constructed at corners of each of the fins.

9. The projector of claim 8, wherein the fin set defines a through channel therein, and the condensing section of the heat pipe is received in the channel.

10. A projector comprising:
    a housing;
    a first LED for generating first light along a first direction;
    a second LED for generating second light along a second direction perpendicular to the first direction;
    a first heat sink having a first heat pipe with a first evaporation section thermally connecting with the first LED, and a first condensing section extending from the first evaporating section, a first fin set thermally connecting with the first condensing section;
    a second heat sink having a second heat pipe with a second evaporating section thermally connecting with the second LED, and a second condensing section extending from the second evaporating section, a second fin set thermally connecting with the second condensing section; and
    a fan received in the housing and located under the first LED, the second LED, the first heat sink and the second heat sink;
    wherein the first fins set is located behind the second evaporating section of the second heat pipe of the second heat sink and the second fin set is located behind the first evaporating section of the first heat pipe of the first heat sink.

11. The projector of claim 10, wherein the fins sets are located closely adjacent to walls of the housing, respectively.

* * * * *